US010851323B2

(12) United States Patent
Braeuer et al.

(10) Patent No.: US 10,851,323 B2
(45) Date of Patent: Dec. 1, 2020

(54) AQUEOUS POLYMER DISPERSIONS, A METHOD FOR THEIR PREPARATION AND THE USE THEREOF AS POUR-POINT DEPRESSANTS FOR CRUDE OIL, PETROLEUM, AND PETROLEUM PRODUCTS

(71) Applicant: BASF SE, Ludwigshafen am Rhein (DE)

(72) Inventors: Judith Christine Braeuer, Ludwigshafen am Rhein (DE); Kai Gumlich, Dubai (AE); Stefan Frenzel, Ludwigshafen am Rhein (DE); Maria Socher, Schwarzheide (DE); Jennifer Anne Jackson, Houston, TX (US); Edward Bohres, Ludwigshafen am Rhein (DE)

(73) Assignee: BASF SE

( * ) Notice: Subject to any disclaimer, the term of this patent is extended or adjusted under 35 U.S.C. 154(b) by 121 days.

(21) Appl. No.: 16/083,250

(22) PCT Filed: Mar. 8, 2017

(86) PCT No.: PCT/EP2017/055423
§ 371 (c)(1),
(2) Date: Sep. 7, 2018

(87) PCT Pub. No.: WO2017/153462
PCT Pub. Date: Sep. 14, 2017

(65) Prior Publication Data
US 2019/0024011 A1  Jan. 24, 2019

(30) Foreign Application Priority Data

Mar. 10, 2016 (EP) .................................. 16159549

(51) Int. Cl.
| | | |
|---|---|---|
| *C10M 145/14* | (2006.01) |
| *C08F 220/18* | (2006.01) |
| *C10L 1/196* | (2006.01) |
| *C10L 10/14* | (2006.01) |
| *C10L 1/16* | (2006.01) |
| *C10M 169/04* | (2006.01) |
| *C08J 3/05* | (2006.01) |
| *C08L 33/06* | (2006.01) |
| *C10L 1/182* | (2006.01) |
| *C10L 1/198* | (2006.01) |
| *C10N 30/00* | (2006.01) |

(52) U.S. Cl.
CPC ......... *C10M 145/14* (2013.01); *C08F 220/18* (2013.01); *C08J 3/05* (2013.01); *C08L 33/06* (2013.01); *C10L 1/165* (2013.01); *C10L 1/1963* (2013.01); *C10L 10/14* (2013.01); *C10M 169/047* (2013.01); *C08F 220/1818* (2020.02); *C08F 2500/02* (2013.01); *C08J 2333/08* (2013.01); *C08J 2333/10* (2013.01);

*C08L 2201/50* (2013.01); *C10L 1/1616* (2013.01); *C10L 1/1826* (2013.01); *C10L 1/1985* (2013.01); *C10L 2250/06* (2013.01); *C10L 2250/08* (2013.01); *C10M 2209/084* (2013.01); *C10N 2030/24* (2020.05)

(58) Field of Classification Search
CPC .......... C10M 145/14; C10M 2209/084; C10M 169/047; C10N 2030/24; C10L 1/1616; C10L 1/165; C10L 1/1826; C10L 1/1963; C10L 1/1985; C10L 10/14; C10L 2250/06; C10L 2250/08; C08F 220/18; C08F 220/1818; C08F 2500/02; C08J 3/05; C08J 2333/08; C08J 2333/10; C08L 33/06; C08L 2201/50

See application file for complete search history.

(56) References Cited

U.S. PATENT DOCUMENTS

| | | | |
|---|---|---|---|
| 4,269,749 A | 5/1981 | Marriott et al. | |
| 5,039,432 A | 8/1991 | Ritter et al. | |
| 5,418,278 A | 5/1995 | Ritter et al. | |
| 9,914,792 B2 | 3/2018 | Voellmar et al. | |
| 2013/0023453 A1* | 1/2013 | Feustel ..................... C10L 1/10 |
| | | | 508/475 |

(Continued)

FOREIGN PATENT DOCUMENTS

| | | |
|---|---|---|
| CA | 1334013 C | 1/1995 |
| CA | 2889070 A1 | 6/2014 |

(Continued)

OTHER PUBLICATIONS

Kim, N., et al., Poly(vinyl alcohol) Stabilization of Acrylic Emulsion Polymers Using the Miniemulsion Approach, Macromolecules, 2003, vol. 36, pp. 5573-5579.
International Preliminary Report on Patentability for PCT/EP2017/055423 dated May 31, 2018.
International Search Report for PCT/EP2017/055423 dated Mar. 30, 2017.
Written Opinion of the International Searching Authority for PCT/EP2017/055423 dated Mar. 30, 2017.
U.S. Appl. No. 15/778,723, filed May 24, 2018.

Primary Examiner — James C Goloboy
(74) Attorney, Agent, or Firm — Faegre Drinker Biddle & Reath LLP

(57) ABSTRACT

The invention relates to aqueous polymer dispersions comprising at least one polymer obtainable by the reaction of at least one monomer M1 of the general formula $H_2C{=}CH{-}C(O)OR$ (I), wherein R is an unbranched alkyl chain comprising from 18 to 22 carbon atoms, and optionally at least one monomer M2. The invention relates moreover to a method for the preparing of such aqueous polymer dispersion and the use thereof as pour point depressant for crude oil, petroleum, and petroleum products.

14 Claims, No Drawings

(56) References Cited

U.S. PATENT DOCUMENTS

| | | | | |
|---|---|---|---|---|
| 2014/0166287 A1* | 6/2014 | Faul | ........................ | E21B 43/16 166/305.1 |
| 2015/0368409 A1* | 12/2015 | Pakusch | .................... | C08J 3/12 524/5 |
| 2016/0032200 A1 | 2/2016 | Garcia Castro et al. | | |

FOREIGN PATENT DOCUMENTS

| | | | | |
|---|---|---|---|---|
| CA | 2889773 A1 | 6/2014 | | |
| DE | 3807394 A1 | 9/1989 | | |
| DE | 3807395 A1 | 9/1989 | | |
| EP | 0359061 A1 | 3/1990 | | |
| WO | WO-9851731 A1 * | 11/1998 | .......... | C10M 161/00 |
| WO | WO-2006075109 A1 | 7/2006 | | |
| WO | WO-2012170241 A1 | 12/2012 | | |
| WO | WO-2013120752 A1 | 8/2013 | | |
| WO | WO-2014095408 A1 | 6/2014 | | |
| WO | WO-2014095412 A1 | 6/2014 | | |
| WO | WO-2014146921 A1 | 9/2014 | | |

\* cited by examiner

AQUEOUS POLYMER DISPERSIONS, A METHOD FOR THEIR PREPARATION AND THE USE THEREOF AS POUR-POINT DEPRESSANTS FOR CRUDE OIL, PETROLEUM, AND PETROLEUM PRODUCTS

CROSS-REFERENCE TO RELATED APPLICATIONS

This application is a national stage application (under 35 U.S.C. § 371) of PCT/EP2017/055423, filed Mar. 8, 2017, which claims benefit of European Application No. 16159549.1, filed Mar. 10, 2016, both of which are incorporated herein by reference in their entirety.

The invention relates to aqueous polymer dispersions comprising at least one polymer obtainable by the reaction of reactive monomers M comprising at least one monomer M1 of the general formula $H_2C=CH-C(O)OR$ (I), wherein R is an unbranched alkyl chain comprising from 18 to 22 carbon atoms, and optionally at least one monomer M2. The invention relates moreover to a method for the preparation of such aqueous polymer dispersions and the use thereof as pour-point depressant and/or wax inhibitors and/or wax dispersant for crude oil, petroleum, and petroleum products.

Underground mineral oil formations typically have relatively high temperatures. After the production of the crude oil to the surface, the crude oil produced thereof cools down to a greater or lesser degree according to the production temperature and the storage and transport conditions.

According to their origin, crude oils have different proportions of waxes, which consist essentially of long-chain n-paraffins. According to the type of crude oil, the proportion of such paraffins may typically be 1 to 30% by weight of the crude oil. When the temperature goes below a particular level in the course of cooling, the paraffins can crystallize, typically in the form of platelets. The precipitated paraffins considerably impair the flowability of the oil. The platelet-shaped n-paraffin crystals can form a kind of house-of-cards structure which encloses the crude oil, so that the crude oil ceases to flow, even though the predominant portion is still liquid. The lowest temperature at which a sample of oil still flows in the course of cooling is referred to as the pour point ("yield point"). For the measurement of the pour point, standardized test methods are used. Precipitated paraffins can block filters, pumps, pipelines and other installations or be deposited in tanks, thus entailing a high level of cleaning.

The deposit temperature of oil deposits is generally above room temperature, for example 40° C. to 100° C. Crude oil is produced from such deposits while still warm, and it naturally cools more or less quickly to room temperature in the course or after production, or else to lower temperatures under corresponding climatic conditions. Crude oils may have pour points above room temperature, so such that crude oils of this kind may solidify in the course of or after production.

It is known that the pour point of crude oils can be lowered by suitable additives. This can prevent paraffins from precipitating in the course of cooling of produced crude oil. Suitable additives firstly prevent the formation of said house-of-cards-like structures and thus lower the temperature at which the crude oil solidifies. In addition, additives can promote the formation of fine, well-crystallized, non-agglomerating paraffin crystals, such that undisrupted oil transport is ensured. Such additives are referred to as pour point depressants or flow improvers.

Paraffin inhibitors or wax inhibitors refer to those substances intended to prevent the deposition or paraffin waxes on surfaces in contact with crude oils or other wax-containing oils and/or mineral oil products. Wax dispersants refer to substances that intend to keep the wax particles from agglomerating.

WO 2006/075109 A1 relates to aqueous emulsions suitable for the inhibition of the deposition of paraffins contained in crude petroleum oil and as additives for the deparaffining of crude oils in order to obtain lubrication oils for example. The aqueous emulsions described therein comprises copolymers of alkyl(meth)acrylates(s) comprising between 6 and 60 carbon atoms, optionally further alkyl (meth)acrylates and/or (meth)acrylamides, a co-solvent or an co-dispersant and surfactants and/or protective colloids. The emulsion is prepared by radical aqueous polymerization of an emulsion or a miniemulsion of the used monomers and the further components in water.

WO 2014/095408 A1 describes the use of polymer formulations as pour-point depressants for crude oil, mineral oils or mineral oil products, wherein the formulation comprises at least two different solvents with a flash point of at least 60° C. and a polymeric composition. The polymer composition is obtainable by radical polymerization of at least one alkyl(meth)acrylate of the formula $H_2C=CR^1-COOR^2$, wherein $R^1$ is H or methyl and $R^2$ is a linear alkyl radical with 12 to 60 carbon atoms in the presence of at least one ethylene-vinyl ester copolymer.

WO 2014/095412 A1 relates to polymer compositions obtainable by radical polymerization of at least two different alkyl(meth)acrylates in the presence of at least one ethylene-vinyl ester copolymer and the use thereof as pour-point depressant for crude oil, mineral oils or mineral oil products. The mixture of alkyl(meth)acrylates comprises at least one alkyl(meth)acrylate of the formula $H_2C=C(R^2)COOR^3$, wherein $R^2$ is H or methyl, and $R^3$ is a linear alkyl chain having 12 to 16 carbon atoms, and at least one alkyl(meth) acrylate of the formula $H=C(R^2)-COOR^4$, wherein $R^2$ is as defined above and $R^4$ is selected from the group of radicals $R^{4a}$, $R^{4b}$ and $R^{4c}$, wherein $R^{4a}$ is a linear alkyl chain having 1 to 11 carbon atoms, $R^{4b}$ is a branched alkyl chain having 4 to 60 carbon atoms and $R^{4c}$ is a cyclic alkyl radical having 5 to 20 carbon atoms.

EP 0 359 061 A1 describes the use of an aqueous emulsion of a copolymer, comprising (meth)acrylate ester of a higher alcohol containing from 16 to 30 carbon atoms, and ethylenically unsaturated mono and dicarboxylic acids having up to 10 carbon atoms or their anhydrides and optionally (meth)acrylate esters of short-chain alcohols having up to 8 carbon atoms for reducing the pour-point and flow-point of hydrocarbon mixtures.

The use of copolymers comprising (meth)acrylate esters of higher alcohol containing at least 16 carbon atoms and further monomers, for example maleic anhydride or (meth) acrylic acid for reducing the pour-point and flow-point of crude oil and mineral oil fractions comprising paraffins is described in DE 38 07 394 A1 and DE 38 07 395.

Despite the known pour-point depressants there is still a need for further pour-point depressing compositions with improved application properties.

Known pour point depressants frequently are solid or wax-like at ambient temperature and therefore require a heating step to obtain them liquefied.

It is therefore an object of the present invention to provide a pour-point depressant with improved handling properties. It is also an object of the present invention to provide improved wax inhibitors and/or wax dispersants.

This objective is achieved by an aqueous polymer dispersion comprising
a) 10 to 55% by weight based on the dispersion of at least one polymer P obtainable by the reaction of reactive monomers M, wherein the reactive monomers M comprise
50 to 100% by weight of at least one monomer M1 of the general formula (I)

$$H_2C\!=\!CH\!-\!C(O)OR \qquad (I)$$

wherein R is an unbranched alkyl chain comprising from 18 to 22 carbon atoms; and
0 to 50% by weight of at least one monomer M2, which is different from monomer M1,
wherein the amounts of the monomers M1 and M2 are each based on the total amount of all reactive monomers M;
wherein the polymer P has a weight-average molecular weight $M_w$ of 20,000 to 150,000 g/mol;
and wherein the polymer P is present in the form of particles having an average particle size $d_{50}$ of from 75 nm to 400 nm;
b) 0 to 24.5% by weight based on the total amount of the aqueous polymer dispersion of at least one with water miscible solvent;
c) 0 to 30% by weight based on the total amount of the aqueous polymer dispersion of at least one hydrophobic organic solvent;
d) 10 to 30% by weight based on the total amount of reactive monomers M of at least one protective colloid; and
e) 0 to 5% by weight based on the total amount of the aqueous polymer dispersion of at least one surfactant.

A further aspect of the present invention is method for the preparation of the aqueous polymer dispersion.

A further aspect of the invention is the use of the aqueous polymer dispersion as pour point depressant for crude oil, petroleum and petroleum products.

It has been found that the aqueous polymer dispersion according to the invention has good application properties in view of pour-point depression and application safety and moreover has good handling properties. Particularly, the present aqueous polymer dispersion is liquid at ambient temperature, whereby the handling properties are improved. Moreover, the polymer dispersion has a high solid content and therefore has a reduced solvent-content.

Aqueous Polymer Dispersion

The aqueous polymer dispersion according to the invention comprises
a) 10 to 55% by weight based on the total amount of the aqueous polymer dispersion of at least one polymer P;
b) 0 to 24.5% by weight based on the total amount of the aqueous polymer dispersion of at least one with water miscible solvent;
c) 0 to 30% by weight by weight based on the total amount of the aqueous polymer dispersion of at least one hydrophobic organic solvent;
d) 10 to 30% by weight based on the total amount of reactive monomers M of at least one protective colloid; and
e) 0 to 5% by weight by weight based on the total amount of the aqueous polymer dispersion of at least one surfactant.

The aqueous polymer dispersion may contain one or more further components different from the components a), b), c), d), and e).

An example for a further component is a polymerization initiator, which is used as trigger for the polymerization of the reactive monomers M to form at least one polymer P. Depending on the used amounts and the nature of the specific initiator the aqueous polymer dispersion may comprise from 0.1 to 5%, preferably 0.1 to 3%, particularly preferably 0.2 to 2.0% by weight and more preferably 0.2 to 1.5% by weight based on the total amount of reactive monomers M of at least one polymerization initiator. In the context of the aqueous polymer dispersion the term "polymerization initiator" refers to the polymerization initiator in the form it is used to start the polymerization as well as in the form it is present after the polymerization reaction, i.e. in the form of its decomposition products and other modified forms.

The aqueous polymer dispersion according to the invention of course comprises water in such an amount that all components of the dispersion including water results in 100% by weight.

In a preferred embodiment the polymer composition according of the invention consist of water, and the components a), b), c), d), and e).

Suitable for the aqueous polymer dispersion is the use of distilled water, tap water, or deionized water, preferred are distilled water and deionized water, particularly preferably deionized water is used.

Polymer P

The aqueous polymer dispersion according to the invention comprises 10 to 55% by weight, preferably 20 to 55% by weight, preferably 30 to 50% by weight, particularly preferably 35 to 45% by weight, and also particularly preferably 30 to 35% by weight based on the total amount of the aqueous polymer dispersion of at least one polymer P. The dispersion according to the invention of course can contain two or more different polymers P, for example three, four or five different polymers P.

The at least one polymer P is obtainable by the reaction, i.e. by the polymerization, of reactive monomers M, wherein the reactive monomers M comprise at least one monomer M1 and optionally at least one monomer M2, which is different from monomer M1.

The term "reactive monomers M" for the purpose of the present invention refers to monomers M, which are polymerizable under the reaction conditions prevailing during the preparation of polymer P.

The reactive monomer M may comprise up to 50% by weight based on the total amount of reactive monomers M, preferably up to 39% by weight, preferably up to 28% by weight, preferably up to 17% by weight, more preferably up to 6% by weight of further monomers different from monomers M1 and M2. However, in particularly preferred embodiments the reactive monomers M consist of monomers M1 and M2.

The at least one polymer P is obtained by the reaction of reactive monomers M, comprising, preferably consisting of,
50 to 100% by weight, preferably 60 to 99% by weight, more preferably 70 to 98% by weight, more preferably 80 to 97% by weight, particularly preferably 90 to 96% by weight and for example 95% by weight of at least one monomer M1 of the general formula (I); and
0 to 50% by weight, preferably from 1 to 40% by weight, preferably from 2 to 30% by weight, preferably from 3 to 20% by weight, particularly preferably form 4 to 10% by weight and for example 5% by weight of at least one monomer M2, which is different from monomer M1, wherein the amounts of the monomers M1 and M2 are each based on the total amount of all reactive monomers M.

The at least one monomer M1 is of the general formula $H_2C=CH-C(O)OR$ (I), wherein R is an unbranched alkyl chain comprising from 18 to 22 carbon atoms.

The at least one monomer M1 can comprise only one monomer M1 or a mixture of two or more different monomers M1.

In a preferred embodiment of the invention, the at least one monomer M1 is a mixture, comprising, preferably consisting of,

- 40 to 55% by weight, based on the total amount of monomers M1, of monomers M1 of formula (I), wherein R is an unbranched alkyl chain comprising 18 carbon atoms;
- 10 to 15% by weight, based on the total amount of monomers M1, of monomers M1 of formula (I), wherein R is an unbranched alkyl chain comprising 20 carbon atoms; and
- 35 to 45% by weight, based on the total amount of monomers M1, of monomers M1 of formula (I), wherein R is an unbranched alkyl chain comprising 22 carbon atoms.

The preferred mixture given above is for example available as Behenyl acrylate of BASF SE (BEA 1822, BEA 1822 F).

Preferred monomers M2 are selected from the group consisting of acrylate monomers of the general formula (II),

$$H_2C=CH-C(O)OR^3 \quad (II),$$

wherein $R^3$ is a branched or unbranched alkyl chain comprising from 1 to 10 carbon atoms; methacrylate monomers of the general formula (III)

$$H_2C=C(CH_3)-C(O)OR^4 \quad (III),$$

wherein $R^4$ is a branched or unbranched alkyl chain comprising from 1 to 10 carbon atoms;
and styrene monomers.

In a preferred embodiment, the at least one monomer M2 is an acrylate monomer of the general formula (II) or a methacrylate monomer of the general formula (III), particularly preferred are acrylate monomers of the general formula (II).

In a preferred embodiment the at least one monomer M2 is a monomer of the general formula (II), wherein $R^3$ is a branched or unbranched alkyl chain comprising 4 to 8 carbon atoms. More preferred $R^3$ is a branched or unbranched alkyl chain comprising 4 or 8 carbon atoms. Particularly preferably $R^3$ is a branched alkyl chain comprising 8 carbon atoms or an unbranched alkyl chain comprising 4 carbon atoms. Thus, in a particularly preferred embodiment of the invention the at least one monomer M2 is butyl acrylate or 2-ethyl hexylacrylate.

The at least one monomer M2 can comprise only one monomer M2 or a mixture of two or more different monomers M2. In a particularly preferred embodiment the at least one monomer M2 comprise exclusively one monomer M2.

In a preferred embodiment the at least one polymer P is obtained by the reaction of exclusively monomers M1 of the general formula (I). In another preferred embodiment the at least one polymer P is obtained by the reaction of monomers M1 of the general formula (I) and monomers M2.

The obtained polymer P therefore comprises monomer units of at least one monomer M1 and optionally monomer units of at least one monomer M2.

In one embodiment the polymer P according to the invention refers to a polymer comprising monomer units of only one monomer M1. In a further embodiment polymer P comprises monomer units of two or more different monomers M1. In a preferred embodiment polymer P comprises monomer units of three or more, particularly preferably three, different monomers M1 of the general formula (I).

In a further embodiment, polymer P refers to a polymer comprising monomer units of only one monomer M1 and monomer units of only one monomer M2. In a further embodiment, polymer P refers to a polymer comprising monomer units of two or more different monomers M1 and monomer units of two or more different monomer M2. In a preferred embodiment polymer P comprises monomer units of at least three, preferably three, different monomers M1 of the general formula (I) and of one monomer M2.

In a preferred embodiment of the invention, the at least one polymer P of the invention comprises monomer units from three different monomers M1, wherein the three different monomer M1 are monomers M1 of formula (I), wherein R is an unbranched alkyl chain comprising 18 carbon atoms; monomers M1 of formula (I), wherein R is an unbranched alkyl chain comprising 20 carbon atoms; and monomers M1 of formula (I), wherein R is an unbranched alkyl chain comprising 22 carbon atoms.

The polymer P is present in the aqueous polymer dispersion in the form of particles having an average particle size $d_{50}$ from 75 nm to 400 nm, preferably from 100 to 300 nm and particularly preferably from 150 to 250 nm.

Determining the average particle size $d_{50}$ can be preferably effected by Column Hydrodynamic Chromatography (HDC). The skilled person in general is familiar with said method.

The determination of the average particle size $d_{50}$ according to HDC can be, e. g., effected with a particle size distribution analyzer of the type PL-PSDA from Polymer Laboratories operating on the principle of packed column hydrodynamic chromatography. Thereby, an eluent is continuously pumped through the system at a constant flow rate. The components of the sample are separated by an HDC mechanism in a cartridge and their concentration is measured by a UV detector, e. g. at a wavelength of 254 nm. The system can be calibrated using a series of particle size standards.

As packed column can be used Cartridge PL0850-1020 (until 1200 nm), filled with polystyrene beads. The eluent is pumped with a constant flow rate (e. g. of 2 ml/min, at a pressure of 3 MPa) through the system. Before the measurement begins the sample typically is filtered and diluted (absorption of 0.3 AU/volume unit).

The eluent typically comprises surfactants and salts in demineralized water. An exemplary eluent comprises
- 0.24 g/l sodium dihydrogen phosphat
- 0.5 g/l sodium dodecyl sulfate
- 2 g/l polyoxyethylen (23) laurylether (Brij®35)
- 9.2 g/l sodium azide, a and has an pH value of about 5.5 to 6.

The polymer P of the invention has a weight-average molecular weight $M_w$ of 20 000 to 150 000 g/mol, preferably 20 000 to 100 000 g/mol.

Determining the weight average molecular weight is familiar to a person skilled in the art and is effected more particularly by gel permeation chromatography (GPC) according to DIN 55672-1:1995-02, respectively size exclusion chromatography (SEC), using standard polymers of defined molecular weight.

With Water Miscible Solvent

The aqueous dispersion of the invention comprises 0 to 24.5% by weight, preferably 5 to 20% by weight, particularly preferably 8 to 15% by weight, based on the total amount of the aqueous polymer dispersion, of at least one with water miscible solvent.

Examples of water-miscible solvents include especially alcohols such as methanol, ethanol and n-propanol, n-butanol, iso-butanol, sec-butanol, tert-butanol, pentanol, ethylene glycol and derivatives thereof, butyl ethylene glycol, 1,2-propylene glycol, butyl diethylene glycol or butyl triethylene glycol.

In a preferred embodiment of the invention, the at least one with water miscible solvent is 1,2-propylene glycol.

Protective Colloid

The aqueous polymer dispersion according to the invention comprises 10 to 30% by weight, preferably 10 to 25% by weight, and particularly preferably 15 to 20% by weight based on the total amount of reactive monomers M of at least one protective colloid.

The at least one protective colloid is present in the aqueous polymer dispersion since polymer P is prepared in the presence of the protective colloid, which acts as a stabilizer during the polymerization of the reactive monomers M.

The protective colloid according to the invention is a water-soluble polymeric compound which, on solvation, is capable of stabilizing dispersions of water-insoluble polymers. In contrast to emulsifier and/or surfactants, they generally do not lower the interfacial tension between polymer particles and water. The number-average molecule weight of the protective colloid can be greater than 1000 g/mol or greater than 2000 g/mol, and can be less than 50,000 g/mol or less than 10,000 g/mol. For example the number-average molecule weight of the protective colloid can be from 1000 to 100,000 g/mol, from 5000 to 50,000 g/mol or form 10,000 to 20,000 g/mol.

A comprehensive description of protective colloids is given in Houben-Weyl, Methoden der organischen Chemie, Volume XIV/1, Makromolekulare Stoffe [Macromolecular compounds], Georg-Thieme-Verlag, Stuttgart, 1961, pages 411 to 420. Protective colloids contemplated include, for example, amphiphilic polymers that include hydrophobic groups and hydrophilic groups. These can be natural polymers, such as starch, or synthetic polymers.

The protective colloid can be formed from at least 40% by weight of nonionic principal monomers, defined in more detail below, and also from a second kind of monomer, selected from ethylenically unsaturated acid monomers. The protective colloid can, furthermore, be formed optionally from additional monomers such as nonionic monomers. The protective colloid can be produced from 40% to 80% or from 50% to 80% by weight of principal monomers selected from the group consisting of $C_1$ to $C_{20}$ alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, and mixtures of these monomers.

Principal monomers for the protective colloid are, for example, (meth)acrylic acid alkyl esters with a $C_{1-10}$ alkyl radical, such as methyl methacrylate, methyl acrylate, n-butyl acrylate, ethyl acrylate, 2-ethylhexyl acrylate, and mixtures thereof. For example, the principal monomers can be mixtures of the (meth)acrylic acid alkyl esters. Vinyl esters of carboxylic acids having 1 to 20 carbon atoms include, for example, vinyl laurate, vinyl stearate, vinyl propionate, versatic acid vinyl esters, vinyl acetate, and mixtures thereof. Suitable vinylaromatic compounds include styrene, alpha- and para-methylstyrene, alpha-butylstyrene, 4-n-butylstyrene, 4-n-decylstyrene, vinyltoluene, and mixtures thereof. Examples of nitriles include acrylonitrile and methacrylonitrile. The vinyl halides include ethylenically unsaturated compounds substituted by chlorine, fluorine or bromine, such as vinyl chloride and vinylidene chloride. Vinyl ethers include, for example, vinyl ethers of alcohols comprising 1 to 4 carbon atoms such as vinyl methyl ether and vinyl isobutyl ether. Hydrocarbons having 4 to 8 carbon atoms and two olefinic double bonds include butadiene, isoprene, and chloroprene. In some embodiments, principal monomers for the protective colloid include $C_{1-10}$ alkyl acrylates and methacrylates or $C_{1-8}$ alkyl acrylates and methacrylates, vinylaromatics such as styrene and alpha-methylstyrene, and mixtures thereof. In some embodiments, the principal monomers include methyl acrylate, methyl methacrylate, ethyl acrylate, n-butyl acrylate, n-butyl methacrylate, n-hexyl acrylate, octyl acrylate, 2-ethylhexyl acrylate, 2-propylheptyl acrylate, styrene, alpha-methylstyrene, and mixtures of these monomers.

The protective colloid can include at least 15% (for example from 15% to 60%, from 20% to 55%, or from 30% to 50%) by weight of ethylenically unsaturated acid monomers. Ethylenically unsaturated acid monomers include, for example, ethylenically unsaturated carboxylic acids, ethylenically unsaturated sulfonic acids, and vinylphosphonic acid. In some embodiments, the ethylenically unsaturated carboxylic acids include alpha, beta-monoethylenically unsaturated monocarboxylic and dicarboxylic acids having 3 to 6 carbon atoms in the molecule. Examples include acrylic acid, methacrylic acid, itaconic acid, maleic acid, fumaric acid, crotonic acid, vinylacetic acid, vinyllactic acid, and mixtures thereof. Suitable ethylenically unsaturated sulfonic acids include, for example, vinylsulfonic acid, styrenesulfonic acid, acrylamidomethylpropane-sulfonic acid, sulfopropyl acrylate, sulfopropyl methacrylate, and mixtures thereof. In some embodiments, the ethylenically unsaturated acid monomers include acrylic acid, methacrylic acid, and a mixture thereof. The acid monomers can be used in the form of the free acids and also in a form partially or fully neutralized with suitable bases, for the polymerization. In some embodiments, aqueous sodium or potassium hydroxide solution or ammonia is used as a neutralizing agent.

In one embodiment, the protective colloid has a number-average molecular weight of 1000 to 10 000 g/mol. In some embodiments, the protective colloid is derived from monomers including one or more 01-20 alkyl (meth)acrylates (e.g., butyl acrylate, ethyl acrylate and methyl methacrylate) and one or more ethylenically unsaturated carboxylic acids (e.g., acrylic acid), and can optionally further include styrene. Preferably, the at least one protective colloid is derived from monomers including one or more $C_{1-20}$ alkyl (meth)acrylates and one or more ethylenically unsaturated carboxylic acids.

The protective colloid in said embodiment can have a glass transition temperature $T_g$ from −20° C. to 60° C. or from −10° C. to 40° C.

The glass transition temperature can be determined by differential scanning calorimetry (DSC) by measuring the midpoint temperature using ASTM D3418-08.

In a particularly preferred embodiment, the at least one protective colloid is obtained by the reaction, i.e. by the polymerization, of 15 to 40% by weight of at least one monomer A1 selected from the group consisting of acrylic acid, methacrylic acid, crotonic acid, fumaric acid, maleic acid, maleic anhydride, 2-methylmaleic acid and itaconic acid, and 60 to 85% by weight of at least one monomer A2 selected form the group consisting of styrene, alpha-methyl styrene, o- or p-vinyltoluene, p-acetoxystyrene, p-bromostyrene, p-tert-butylstyrene, o-, m- or p-chlorostyrene, methyl methacrylate, n-butyl acrylate, 2-ethylhexyl acrylate, tert-butyl acrylate, tert-butyl methacrylate, ethyl methacrylate, isobutyl methacrylate, n-hexyl acrylate, cyclohexyl methacrylate, acrylonitrile, methacrylonitrile, tert-butyl vinyl ether or cyclohexyl vinyl ether, wherein the given amounts of monomers A1 and A2 are each based on the total amount of the at least one protective colloid.

and more preferably of 15 to 30% by weight of at least one monomer A1 selected from the group consisting of acrylic acid, methacrylic acid, crotonic acid, fumaric acid, maleic acid, maleic anhydride, 2-methylmaleic acid and itaconic acid, and 70 to 85% by weight of at least one monomer A2 selected form the group consisting of styrene, alpha-methyl styrene, o- or p-vinyltoluene, p-acetoxystyrene, p-bromostyrene, p-tert-butylstyrene, o-, m- or p-chlorostyrene, methyl methacrylate, n-butyl acrylate, 2-ethylhexyl acrylate, tert-butyl acrylate, tert-butyl methacrylate, ethyl methacrylate, isobutyl methacrylate, n-hexyl acrylate, cyclohexyl methacrylate, acrylonitrile, methacrylonitrile, tert-butyl vinyl ether or cyclohexyl vinyl ether, in polymerized form, wherein the given amounts of monomers A1 and A2 are each based on the total amount of the at least one protective colloid.

In a more preferred embodiment the at least one protective colloid is obtained by the reaction, i.e. by the polymerization of 15 to 40% by weight of acrylic acid and/or methacrylic acid, and 60 to 85% by weight of methyl methacrylate, n-butyl acrylate, 2-ethylhexyl acrylate, styrene and/or alpha-methyl styrene;

wherein the given amounts are each based on the total amount of the at least one protective colloid.

In a particularly preferred embodiment the at least one protective colloid is obtained by the reaction, i.e. by the polymerization of 15 to 30% by weight of acrylic acid, methacrylic acid, or a mixture thereof; and 70 to 85% by weight of methyl methacrylate, n-butyl acrylate, 2-ethylhexyl acrylate, styrene, alpha-methyl styrene, or a mixture of two or more thereof, in polymerized form, wherein the given amounts are each based on the total amount of the at least one protective colloid.

Such polymers and methods for their preparation are described in WO 2014/146921 A1 and are commercially available for example as Joncryl™ of BASF SE. Said protective colloids according to the WO 2014/146921 A1 have preferably a glass transition temperature of at least 60° C., preferably at least 80° C. and not more than 130° C. Particularly preferably the protective colloid has a glass transition temperature of 80 to 110° C. The weight-average molecular weight $M_w$ of said polymer is in the range of 1000 to 25000 g/mol, preferably 7500 to 22500 g/mol. The acid number is preferably in the range of 50 to 300, preferably 100 to 230 and particularly preferably in the range of 150 to 230. The acid number for the purpose of the invention is measured according to DIN EN ISO 2114.

The at least one protective colloid is preferably applied in the form of an aqueous suspension or solution. For the purpose of the invention the at least one protective colloid is applied in the partially neutralized or fully neutralized form. Preferably the at least one protective colloid is applied in the fully neutralized form. The partial or full neutralization of the carboxylic acid groups of the at least one protective colloid is effected by common and known bases, such as alkali metal hydroxide, such as sodium hydroxide or potassium hydroxide, alkaline earth metal, such as calcium hydroxide, ammonia, amines, such as diethanolamine, triethanolamine or ethylenediamine. Preferably the partial and most preferably the full neutralized protective colloid is applied. Sodium hydroxide and/or potassium hydroxide and/or ammonia are used most preferably for the neutralization of the acid groups of the at least one protective colloid.

Surfactant

The aqueous polymer dispersion comprises 0 to 5% by weight, based on the total amount of the aqueous polymer dispersion, preferably 0.01 to 2% by weight, particularly preferably 0.05 to 1% by weight of at least one surfactant.

The at least one surfactant is present in the aqueous polymer dispersion in the case that polymer P is prepared in the presence of at least one surfactant.

The polymerization can optionally be carried out in the presence of one or more ionic and/or nonionic surfactants, which help to maintain the dispersion of the monomers in the aqueous medium. In some embodiments, the above-mentioned protective colloids can be used as the sole dispersant, i.e. without the addition of surfactants. If desired, and in a preferred embodiment of the invention, however, small amounts of surfactants can also be used as well.

Customary nonionic surfactants are for example ethoxylated mono-, di- and trialkylphenols (EO degree: 3 to 50, alkyl radical: $C_4$ to $C_{12}$) and also ethoxylated fatty alcohols (EO degree: 3 to 80, alkyl radical: $C_8$ to $C_{36}$). Examples thereof are the Lutensol® A brands ($C_{12}C_{14}$ fatty alcohol ethoxylates, EO degree: 3 to 8), Lutensol® AO brands ($C_{13}C_{15}$ oxo process alcohol ethoxylates, EO degree: 3 to 30), Lutensol® AT brands ($C_{16}C_{18}$ fatty alcohol ethoxylates, EO degree: 11 to 80), Lutensol® ON brands ($C_{10}$ oxo process alcohol ethoxylates, EO degree: 3 to 11) and the Lutensol® TO brands ($C_{13}$ oxo process alcohol ethoxylates, EO degree: 3 to 20) from BASF SE.

Customary anionic surfactants are for example alkali metal and ammonium salts of alkyl sulfates (alkyl radical: $C_8$ to $C_{12}$), of sulfuric monoesters of ethoxylated alkanols (EO degree: 4 to 30, alkyl radical: $C_{12}$ to $C_{18}$) and ethoxylated alkylphenols (EO degree: 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$).

Suitable anionic surfactants further include compounds of the general formula (Ia)

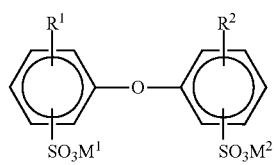

where $R^1$ and $R^2$ are H atoms or $C_4$ to $C_{24}$ alkyl that are not H atoms at the same time, and M1 and M2 can be alkali metal ions and/or ammonium ions. In the general formula (Ia), $R^1$ and $R^2$ are preferably linear or branched alkyl radicals of 6 to 18 carbon atoms and more particularly of 6, 12 and 16 carbon atoms, or hydrogen, with the proviso that $R^1$ and $R^2$ are not both an H atom at the same time. $M^1$ and $M^2$ are each preferably sodium, potassium or ammonium, of which sodium is particularly preferred. Particularly advantageous are compounds (Ia) in which $M^1$ and $M^2$ are both sodium, $R^1$ is a branched alkyl radical of 12 carbon atoms and $R^2$ an H atom or $R^1$. Technical grade mixtures are frequently used that include a 50 to 90 wt % fraction of monoalkylated product, for example Dowfax® 2A1 (trademark of Dow Chemical Company). Compounds (I) are common knowledge, for example from U.S. Pat. No. 4,269,749, and commercially available.

Suitable cation-active surfactants are generally $C_6$-$C_{18}$-alkyl-, -alkylaryl- or heterocyclyl containing primary, secondary, tertiary or quaternary ammonium salts, alkanolammonium salts, pyridinium salts, imidazolinium salts, oxazolinium salts, morpholinium salts, thiazolinium salts and also salts of amine oxides, quinolinium salts, isoquinolinium salts, tropylium salts, sulfonium salts and phosphonium salts. Examples which may be mentioned are dodecylammonium acetate or the corresponding sulfate, the sulfates or acetates of the various 2-(N,N,N-trimethylammonium) ethyl paraffinic acid esters, N-cetylpyridinium sulfate, N-laurylpyridinium sulfate and also N-cetyl-N,N,N-trimethylammonium sulfate, N-dodecyl-N,N,N-trimethylammonium sulfate, N-octyl-N,N,N-trimethylammonium sulfate, N,N-distearyl-N,N-dimethylammonium sulfate and also the gemini surfactant N,N-(lauryldimethyl)ethylene-diamine disulfate, ethoxylated tallow-alkyl N-methylammonium sulfate and ethoxylated oleylamine (for example Uniperol® AC from BASF SE, about 11 ethylene oxide units). Numerous further examples are given in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. It is beneficial when the anionic counter-groups have very low nucleophilicity, for example perchlorate, sulfate, phosphate, nitrate and carboxylates, for example acetate, trifluoroacetate, trichloroacetate, propionate, oxalate, citrate, benzoate, and also conjugated anions of organosulfonic acids, for example methylsulfonate, trifluoromethylsulfonate and para-toluenesulfonate, further tetrafluoroborate, tetraphenyl-borate, tetrakis(pentafluorophenyl)borate, tetrakis[bis(3,5-trifluoromethyl)phenyl]-borate, hexa-fluorophosphate, hexafluoroarsenate or hexafluoroantimonate.

In a particularly preferred embodiment of the invention, the at least one surfactant is a nonionic surfactant, preferably of the general formula (IV)

$$R^5-O-(CH_2CH_2O)_nH \qquad (IV),$$

wherein $R^5$ is a branched or unbranched alkyl radical having 12 to 22, preferably 14 to 20 and particularly preferably 16 to 18 carbon atoms. Preferably $R^5$ is unbranched.

n is 5 to 30, preferably 10 to 25, preferably 16 to 20.

In a particularly preferred embodiment of the present invention the at least one non-ionic surfactant of the general formula (IV) is $C_{16}C_{18}-O-(CH_2CH_2O)_{18}-H$, for example available as Lutensol® AT18 of BASF SE.

Hydrophobic Organic Solvent

The aqueous polymer dispersion according to the invention preferably comprises 0 to 30% by weight, preferably 5 to 20% by weight and particularly preferably 10 to 18% by weight based on the total amount of the aqueous polymer dispersion of at least one hydrophobic organic solvent.

In a preferred embodiment the weight ratio of the at least one polymer P and the at least one hydrophobic organic solvent is at least 1:1, preferably the aqueous polymer dispersion comprises more polymer P than hydrophobic organic solvent.

The at least one hydrophobic organic solvent should be non-polymerizable and may have significant regulating action in the course of free-radical polymerization, for example regulation of the molecular mass distribution of the at least one polymer P.

Examples of suitable solvents comprise saturated aliphatic hydrocarbons, saturated aliphatic alcohols or esters of saturated aliphatic carboxylic acids and saturated aliphatic alcohols.

Preferred solvents have a flashpoint of at least 60° C. Examples of alcohols comprise aliphatic alcohols having at least 8 carbon atoms, such as 1-octanol, 1-decanol or 1-dodecanol. Examples of esters comprise esters of saturated fatty acids having at least 8 carbon atoms with saturated aliphatic alcohols, for example methyl laurate or methyl stearate. Technical mixtures of various aliphatic esters are commercially available. In a further embodiment of the invention, it is possible to use esters of aliphatic or cycloaliphatic dicarboxylic acids, for example dialkyl esters of cyclohexane-1,2-dicarboxylic acid, such as diisononyl cyclohexane-1,2-dicarboxylate.

In a preferred embodiment of the invention, the at least one solvent is selected from saturated aliphatic solvents or solvent mixtures having a flashpoint of at least 60° C. These may be either paraffinic or naphthenic, i.e. saturated cyclic, hydrocarbons. Saturated aliphatic hydrocarbons having a flashpoint of at least 60° C. are high-boiling and typically have a boiling point of at least 175° C.

Examples of suitable hydrocarbons comprise n-undecane (flashpoint 60° C., boiling point 196° C.) or n-dodecane (flashpoint 71° C., boiling point 216° C.). It is possible with preference to use technical mixtures of hydrocarbons, for example mixtures of paraffinic hydrocarbons, mixtures of paraffinic and naphthenic hydrocarbons or mixtures of isoparaffins. It will be apparent to those skilled in the art that technical mixtures may still comprise small residues of aromatic or unsaturated hydrocarbons. The content of aromatic and/or unsaturated hydrocarbons should, however, be generally <1% by weight, preferably <0.5% by weight and more preferably <0.1% by weight.

Technical mixtures of saturated aliphatic solvents are commercially available, for example technical mixtures of the Shellsol® D series or the Exxsole® D series.

It is of course also possible to use mixtures of various hydrophobic organic solvents. In a preferred embodiment of the invention, the at least one hydrophobic organic solvent comprises exclusively saturated aliphatic solvents or solvent mixtures.

To execute the invention, in addition, aromatic solvents or solvent mixtures, preferably having a flashpoint of at least 60° C. can be used. Such hydrocarbons are high-boiling and typically have a boiling point of at least 175° C. In principle, it is possible to use any aromatic hydrocarbons having a flashpoint of at least 60° C., for example naphthalene. It is possible with preference to use technical mixtures of aromatic hydrocarbons. Technical mixtures of aromatic solvents are commercially available, for example technical mixtures of the Shellsol® A series or the Solvesso® series.

Also preferred, the at least one hydrophobic organic solvent is toluene or xylene.

Preferably, the at least one hydrophobic organic solvent is an aromatic or aliphatic hydrocarbon or a mixture thereof.

Preferably the at least one hydrophobic organic solvent is at least one saturated aliphatic solvent, at least one aromatic solvent or a mixture of two or more thereof, with the provision, that the at least one hydrophobic organic solvent has a flashpoint of at least 60° C., or toluene or xylene.

Particularly preferably the at least one hydrophobic organic solvent is at least one saturated aliphatic solvent, at least one aromatic solvent or a mixture of two or more thereof, with the provision, that the at least one hydrophobic organic solvent has a flashpoint of at least 60° C.

Method for the Preparation of the Dispersion

The present aqueous dispersion is preferably prepared by means of miniemulsion polymerization, i.e. a miniemulsion of the reactive monomers M, comprising monomers M1 and optionally monomers M2, which are water insoluble, is polymerized in an aqueous medium. That is the monomers M1 and optionally M2 are a disperse phase in water.

Accordingly, a method for the preparation of the aqueous polymer dispersion according to the invention is provided comprising the steps of
a) preparation of an aqueous monomer dispersion comprising
  a1) 10 to 55% by weight based on the total amount of the resulting aqueous polymer dispersion of reactive monomers M, wherein the reactive monomers M comprise
    50 to 100% by weight based on the total amount of the reactive monomers M of at least one monomer M1 of the general formula (I)

$H_2C=CH-C(O)OR$ (I), and 0 to 50% by weight based on the total amount of the reactive monomers M of at least one monomer M2, which is different from monomer M1,
    wherein the amounts of the monomers M1 and M2 are each based on the total amount of all reactive monomers M;
  a2) 0 to 30% by weight based on the total amount of the resulting aqueous polymer dispersion of at least one hydrophobic organic solvent;
  a3) 10 to 30% by weight based on the total amount of reactive monomers M of at least one protective colloid;
  a4) 0 to 24.5% by weight based on the total amount of the resulting aqueous polymer dispersion of at least one with water miscible solvent;
  a5) 0 to 5% by weight based on the total amount of the resulting aqueous polymer dispersion of at least one surfactant; and
b) ultrasonic processing or homogenization of the aqueous monomer dispersion of step a);
c) addition of at least one polymerization initiator.

The preferred embodiments given above for the aqueous polymer dispersion apply accordingly for the method for the preparation of the aqueous monomer dispersion.

Methods for the miniemulsion polymerization are known to the skilled person and are for example described in D. Crespy et al., Beilstein J. Org. Chem. 2010, 6, 1132 and Schork et al., Adv. Polym. Sci. 2005, 175, 129. Therefore the skilled person is able to select suitable reaction conditions and reaction vessels to prepare the inventive aqueous polymer dispersion by means of miniemulsion polymerization.

Preferably, step a) refers to the mixing of reactive monomers M, the at least one protective colloid, optionally at least one with water miscible solvent, optionally at least one hydrophobic organic solvent, optionally at least one surfactant and water.

In a preferred embodiment step a) of the method according to the invention comprises the step of mixing a first solution, comprising the reactive monomers M and optionally the at least one hydrophobic organic solvent with a second solution, comprising the at least one protective colloid, optionally at least one surfactant, water and optionally at least one with water miscible solvent.

Step b) refers to the ultrasonic processing or homogenization of the aqueous monomer dispersion of step a). The aqueous monomer dispersion in step a) can be regarded as a macroemulsion. By ultrasonic processing or homogenization of said macroemulsion the desired and preferred miniemulsion is obtained.

Thus, preferably, the aqueous monomer dispersion is obtained in form of a miniemulsion after step b).

In general, miniemulsion can be produced by the application of high shear to break up the macroemulsion comprising the reactive monomers M into submicron monomer droplets. For the purpose of the present invention, high shear is provided in step b) by ultrasonic processors or mechanical homogenizers.

Combined with the high shear a stabilizing system is used to stabilize the obtained submicron monomer droplets, particularly to avoid the coalescence of the droplets and to prevent Ostwald ripening.

The present miniemulsion is mainly stabilized by at least one protective colloid, preferably in combination with at least one surfactant.

In a preferred embodiment step b) is carried out for at least 5 minutes, preferably for at least 10 minutes.

Step b) of the inventive method can be carried out in an ultrasonic processor, for example an ultrasonic processor of Dr. Hilscher GmbH, or a mechanical homogenizer, for example a Gaulin homogenizer, preferably in an ultrasonic processor.

Step b) preferably refers to the ultrasonic processing or homogenization of the aqueous monomer dispersion of step a) to obtain a miniemulsion, wherein the reactive monomers M are dissolved in the solvent and forms particles having an average particle size $d_{50}$ of 50 nm to 300 nm, preferably 80 nm to 200 nm.

In a preferred embodiment step b) is carried out by ultrasonic processing.

In a particularly preferred embodiment the aqueous monomer dispersion of step a) is treated with ultrasonic for at least 5 minutes, preferably at least 10 minutes, and preferably with an amplitude of 60% to 100%, preferably 80% to 100% and particularly 100%, preferably 400 W, 24 kHz.

In a preferred embodiment the method for the preparation of the aqueous polymer dispersion according to the invention is carried out under inert gas atmosphere, for example nitrogen or noble gases or mixtures thereof.

In a preferred embodiment step a) of the inventive method is carried out at a temperature of 30 to 60° C., preferably at ambient temperature.

Preferably, step b) is carried out at a temperature of 30 to 60° C., preferably 50 to 60° C. Since the ultrasonic processing respectively the homogenization may lead to a temperature increase of the treated mixture, step b) is preferably carried out under cooling to ensure that the temperature while step b) does not exceed a temperature of 80° C.

In step c) of the present method at least one polymerization initiator is added to the miniemulsion obtained after the ultrasonic-processing or homogenization in step b).

In a preferred embodiment the mixture obtained in step b) is heated to a temperature in the range from 50 to 90° C., preferably from 55 to 70° C. particularly preferably from 60 to 65° C., before the at least one polymerization initiator is added.

Suitable polymerization initiators are known for the skilled person. In general initiators used in the aqueous emulsion polymerization are suitable for triggering the present polymerization step. Suitable polymerization initiators can be found for example in WO 2013/120752.

In principle, not only peroxides but also azo compounds can be concerned here.

Redox initiator systems also come into consideration, as will be appreciated.

As peroxides there can be used in principle inorganic peroxides, such as hydrogen peroxide or peroxodisulfates, such as the mono- or di-alkali metal or ammonium salts of peroxodisulfuric acid, for example its mono- and disodium, potassium or ammonium salts or organic peroxides, such as alkyl hydroperoxides, for example tert-butyl hydroperoxide, p-mentyl hydroperoxide or cumyl hydroperoxide, and also dialkyl or diaryl peroxides, such as di-tert-butyl or dicumyl peroxide. As azo compound it is essentially 2,2'-azobis(isobutyronitrile), 2,2'-azobis(2,4-dimethyl-valeronitrile) and 2,2'-azobis(amidinopropyl)dihydrochloride (AIBA, corresponds to V-50 from Wako Chemicals) which are used. As oxidizing agents for redox initiator systems it is essentially the abovementioned peroxides which come into consideration. A preferred oxidizing agent is tert-butyl hydroperoxide or peroxodisulfate, for example sodium peroxidisulfate and particularly preferred is tert-butyl hydroperoxide.

The peroxide can typically be provided in a form of a solution, for example an aqueous solution comprising for example 10% by weight based on the oxidizing agent.

As corresponding reducing agents there can be used sulfur compounds of low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of multivalent metals, such as iron(II) sulfate, iron(II) ammonium sulfate, iron(II) phosphate, enediols, such as dihydroxymaleic acid, benzoin and/or ascorbic acid and also reducing saccharides, such as sorbose, glucose, fructose and/or dihydroxyacetone, and acetone sodium bisulfite. A preferred reducing agent is sodium formaldehyde sulfoxylate, also known as sodium hydroxymethylsulfinate (available for example as Rongalit C of BASF).

In general, the amount of free-radical initiator comprising an oxidizing agent and optionally an reducing agent used is from 0.1 to 5 wt %, preferably 0.1 to 3 wt %, particularly preferably 0.2 to 2.0% by weight and more preferably 0.2 to 1.5 wt %, based on the total amount of reactive monomers M.

The inventive method can comprise further optional steps, for example purification steps. An example for a suitable purification step is the filtration of the obtained aqueous polymer dispersion to remove insoluble impurities. However, such steps are not required for the intended use of the polymer dispersion A further object of the present invention is an aqueous polymer dispersion obtained by the method according to the invention as described above.

Use of the Dispersion as Pour Point Depressant

The aqueous dispersion according to the invention can be used in accordance with the invention as pour point depressant for crude oil, mineral oil and/or mineral oil products by adding the aqueous dispersion to the crude oil, petroleum, and petroleum products. In addition, it is of course also possible to use further formulations which act as pour point depressants.

Pour point depressants reduce the pour point of crude oils, mineral oils and/or mineral oil products. The pour point ("yield point") refers to the lowest temperature at which a sample of oil, in the course of cooling, still just flows. For the measurement of the pour point, standardized test methods are used.

The aqueous dispersion is typically used in such an amount that the polymer P added is 50 to 5000 ppm based on the oil. The amount is preferably 100 to 2000 ppm, more preferably 250 to 1000 ppm. The amounts are based on the polymer P itself, not including any solvents and further compounds in the aqueous dispersion.

In a preferred embodiment of the invention, the oil is crude oil and the aqueous polymer dispersion is injected into a crude oil pipeline or via capillary string into a well bore region. The injection can preferably be effected at the oilfield, i.e. at the start of the crude oil pipeline, but the injection can of course also be effected at another side. More particularly, the pipeline may be one leading onshore from an offshore platform.

The cooling for the crude oil in flowlines from typically wellhead location to the platform and additionally can be injected after process on the platform and transportation to the shore. The cooling effect can be particularly rapid due to the low temperature of the seabed floor 4° C.

In a further embodiment of the invention, the oil is crude oil and the aqueous polymer dispersion is injected into a production well. Here too, the production well may especially be a production well leading to an offshore platform. The injection is preferably effected approximately at the site where oil from the formation flows into the production well. In this way, the solidification of the crude oil in the production well or an excessive increase in its viscosity can be prevented.

Further Use of the Aqueous Dispersion

The aqueous dispersion according to the invention can of course also be used for other purposes.

In a further embodiment of the invention the above-detailed aqueous polymer dispersions are used as wax inhibitors, i.e. to prevent wax deposits on surfaces in contact with crude oil, mineral oil and/or mineral oil products. The use is effected by adding the aqueous dispersion to the crude oil, mineral oil and/or mineral oil products. Preferred aqueous dispersions have already been mentioned, and the manner of use is also analogues to the use as a pour point depressant.

In a further embodiment of the invention the above-detailed aqueous polymer dispersions are used as wax dispersants, i. e. intend to keep the wax particles from agglomerating. The use is effected by adding the aqueous dispersion to the crude oil, mineral oil and/or mineral oil products. Preferred aqueous dispersions have already been mentioned, and the manner of use is also analogues to the use as a pour point depressant and the use as wax inhibitor.

EXAMPLES

Used Starting Materials

| | |
|---|---|
| Shellsol ® D70 | high boiling aliphatic hydrocarbon mixture supplied by Shell Chemicals, mostly C11-C14 aliphatic hydrocarbons (approx. 60% by weight paraffins, approx. 40% by weight cycloparaffins, aromatic hydrocarbons <100 ppm), initial boiling point 198° C. (ASDTM D86), flash point 74° C. (ASTM D93) |
| Solvesso ® 150 ND | high boiling aromatic hydrocarbon mixture supplied by ExxonMobil Chemical Company, aromatic hydrocarbon >99 vol %, initial boiling point 184° C. (ASTM D86), flash point 64° C. (ASTM D93) |
| Behenyl acrylate | isomer mixture of 40-55% by weight of $C_{18}$-alkyl chain, <15% by weight of $C_{20}$-alkyl chain and 35-45-% by weight of $C_{22}$-alkyl chain, Behenyl acrylate BEA 1822F of BASF SE |
| Protective Colloid | modified styrene-acrylate polymer ($M_w$ ~8500 g/mol, acid number: 216, $T_g$ = 91° C.), neutralized with $NH_3$, ~24 or ~41% by weight in water, Joncryl 678 of BASF SE |
| Non-ionic surfactant | $C_{16}C_{18}$ saturated fatty alcohol ethoxylate ($C_{16}C_{18}$—O—$(CH_2CH_2O)_{18}$H, Lutensol ® AT18 of BASF SE |

Equipment

Ultrasonic processor UP400s (Dr. Hilscher GmbH), sonotrode H14.

Homogenizer APV 1000 (Kindler Maschinen AG): max. pressure: 1000 bar, capacity 22 L/h, charge volume 150 mL, volume in valve 13 ml Preparation of Miniemulsions The miniemulsion can be prepared by ultra-sonic processing or with a homogenizer.
a) The macroemulsion is treated by ultra sound for 10 minutes with an amplitude of 100%. During the treatment the emulsion is cooled with a water bath.
b) The second way to generate a miniemulsion is with a homogenizer. The macroemulsion is passed thru the apparatus at an applied pressure of 600 bar for 1 to 4 cycles.

Example 1

A 2-L vessel equipped with stirrer and reflux was charged with a monomer containing dispersion under nitrogen atmosphere. The dispersion was prepared by mixing of a solution of 230.0 g behenyl acrylate in 135.0 g high boiling aromatic hydrocarbon mixture (Solvesso® 150 ND) with a solution of 236.6 g protective colloid (24.3% in water, neutralized with $NH_3$) and 57.5 g saturated $C_{16}C_{18}$ fatty alcohol ethoxylate (20% by weight in water, ($C_{16}C_{18}$—O—$(CH_2CH_2O)_{18}$H) in a water-glycol mixture (57.5 g demineralized water and 78.4 g of 1,2 propylene glycol). The dispersion was treated with ultrasonotrode for 10 minutes (100%). The reaction mixture was heated to 60° C. and 46.0 tert-butyl hydroperoxide solution (10% by weight in water) were added. Then 35.0 g of a 10% by weight-solution of sodium hydroxymethane sulfonate (aqueous) are fed over 1 h 30 min. The obtained polymer dispersion was cooled to room temperature.

Example 2

A dispersion was manufactured according to example 1, however 135 g Shellsol® D70 was used instead of Solvesso® 150 ND. Furthermore, no 1,2-propylene glycol was added to the aqueous phase.

Example 3

A dispersion was manufactured according to example 1, however 135 g heptane was used instead of Solvesso® 150 ND.

Example 4

A dispersion was manufactured according to example 1, however 230.0 g stearyl acrylate was used instead of behenyl acrylate.

Example 5

A dispersion was manufactured according to example 1, however 230.0 g of a mixture of 95% by weight of behenyl acrylate and 5% by weight of n-butyl acrylate was used.

Example 6

A dispersion was manufactured according to example 1, however 230.0 g of a mixture of 95% by weight of behenyl acrylate and 5% by weight of 2-ethyl hexyl acrylate was used.

Example 7

A 2-L vessel equipped with stirrer and reflux was charged with a monomer containing dispersion under nitrogen atmosphere. The dispersion was prepared by mixing of a solution of 270.0 g melted behenyl with a solution 165.9 g protective colloid (40.7% in water, neutralized with $NH_3$) in a water-glycol mixture (215.7 g demineralized water and 128.6 g of 1,2 propylene glycol) at 50° C. The dispersion was treated with ultrasonotrode for 10 minutes (100%). The reaction mixture was heated to 80° C. and 77.1 g sodium peroxosulfate are fed over 2 h 30 min. The obtained polymer dispersion was cooled to room temperature.

Tests:

Determination of the Pour Point (PP)

The determination of the pour point was conducted according to ASTM D5853 "Test Method for Pour Point of Crude Oils" with a Pour Point tester PPT 45150 of PSL Systemtechnik, Germany. The pour point is the minimum temperature at which a sample of tested oil is still just free flowing. For the tests, a crude oil from the Landau oilfield in south-west Germany (Wintershall Holding GmbH) having an API gravity of 37 and a pour point of 24° C. was used. To determine the lowering of the pour point, the polymer dispersions to be tested were used in the oil in a concentration of 300 ppm of polymer based on the crude oil. The values are compiled in table 1. Double or triple determinations were conducted on some samples. In these cases, all measurements are reported in table 1.

TABLE 1

| | active content [wt-%] | particle size $d_{50}$ [nm] | viscosity [mPas] | $M_N$ [g/mol] | Mw [g/mol] | PP (° C.) (300 ppm) | Comments |
|---|---|---|---|---|---|---|---|
| V1 | — | — | — | — | — | 21; 24 | Oil without additive |
| 1 | 34.7 | 202 | 618 | 6810 | 42200 | 12; 15 | Behenylacrylate in Solvesso |
| 2 | 29.7 | 238 | 87 | 7280 | 109000 | 18; 18 | Behenylacrylate in Shellsol |
| 3 | 35.4 | 230 | 564 | 7170 | 273000 | 18; 18 | Behenylacrylate in Heptane |
| 4 | 33.4 | 216 | 652 | 4610 | 36300 | 12; 15 | Stearyl acrylate in Solvesso |
| 5 | 35.1 | 189 | 576 | 8310 | 55800 | 9; 12 | 95% behenyl acrylate, 5% butyl acrylate in Solvesso |
| 6 | 36.9 | 169 | 546 | 8690 | 56300 | 9; 9 | 95% behenyl acrylate, 5% 2-ethyl hexyl acrylate in Solvesso |
| 7 | 31.5 | 284 | 107 | 4150 | 102000 | 18; 18 | behenyl acrylate without hydrophobic solvent and without surfactant |

Analytical Methods
1) The solid content was analyzed with a halogen moisture analyzer, type HR73 (Mettler Toledo)
2) The molecular weight $M_w$ was analyzed by size exclusion chromatography (SEC) according to DIN 55672-1:1995-02 with THF as eluent and internal polymer standards. The method and the mode of action are known to the skilled person. Advantageously, the measurement is carried out in THF containing 0.1 wt-% trifluoroacetic acid and the method is at a flow rate of 1 ml/L and a column temperature of 35° C. The polymer emulsions are diluted to a concentration of 2 mg/mL and are filtered over 0.2 μm filter (Sartorius Minisart SRP 25) to remove insoluble gel content. A sample of 100 μl is injected. A column system is used consisting of three columns with an inner diameter of 7.5 mm (5 cm pre column—Plgel 10μ Guard pre column) followed by two 30 cm separation columns (each Plgel 10μ Mixed B). A differential refractometer Agilent 1100, UV-Photometer Agilent 110 VWD, PSS SLD7000-BI-MwA (UV/254 nm/Agilent) is used. The calibration is known to the expert and polystyrene standards are used (Polymer Laboratories with $M_w$=580 to $M_w$=7500000, and hexylbenzol (M=162).
3) Particle size distribution was measured with hydrodynamic chromatography (HDC) with a particle size distribution analyzer of the type PL-PSDA from Polymer Laboratories. Conditions: packed column (Cartridge PL0850-1020 (until 1200 nm), filled with polystyrene beads), flow rate 2 ml/min, pressure 3 MPa (30 bar), wavelength: 254 nm. The sample is filtered and diluted (absorption of 0.3 AU/volume unit).

The eluent comprises the following surfactants and salts in demineralized water:
0.24 g/l sodium dihydrogen phosphat
0.5 g/l sodium dodecyl sulfate
2 g/l polyoxyethylen (23) laurylether (Brij®35)
9.2 g/l sodium azide,
and has an pH value of about 5.5 to 6.

In the column the sample was separated into its components by hydrodynamic diameter and eluted according to the size exclusion principle. The elution time was calibrated according to PS-Eichlatices and checked daily. The concentration of the components was measured by a UV detector in the range from 20 to 1200 nm. The detection was carried out at a wavelength of 254 nm.

4) Viscosity measurement was carried out via RVT-type Brookfield viscometer with a RV-3 spindle at 100 rpm.

The invention claimed is:
1. An aqueous polymer dispersion comprising water and further comprising
a) 10 to 55% by weight based on the dispersion of at least one polymer P obtainable by the reaction of reactive monomers M, wherein the reactive monomers M comprise
50 to 100% by weight of at least one monomer M1 of the general formula (I)

$$H_2C=CH-C(O)OR \qquad (I)$$

wherein R is an unbranched alkyl chain comprising from 18 to 22 carbon atoms; and
0 to 50% by weight of at least one monomer M2, which is different from monomer M1;
wherein the amounts of the monomers M1 and M2 are each based on the total amount of all reactive monomers M used in the reaction,
wherein the polymer P has a weight-average molecular weight $M_w$ of 20,000 to 150,000 g/mol according to DIN 55672-1:1995-02; and
wherein the polymer P is present in the form of particles having an average particle size $d_{50}$ of from 75 nm to 400 nm effected by Column Hydrodynamic Chromatography;
b) 0 to 24.5% by weight based on the total amount of the aqueous polymer dispersion of at least one miscible solvent,
c) 5 to 30% by weight based on the total amount of the aqueous polymer dispersion of at least one hydrophobic organic solvent,
d) 10 to 30% by weight based on the total amount of monomers M of at least one protective colloid, wherein the at least one protective colloid is a polymer obtained by the reaction of
15 to 40% by weight of acrylic acid, methacrylic acid, or a mixture thereof; and
60 to 85% by weight of methyl methacrylate, n-butyl acrylate, 2-ethylhexyl acrylate, styrene, alpha-methyl styrene, or a mixture of two or more thereof,
wherein the given amounts are each based on the total amount of the at least one protective colloid; and e) 0 to 5% by weight based on the total amount of the aqueous polymer dispersion of at least one surfactant.

2. The dispersion according to claim 1, wherein the at least one monomer M1 is a mixture, comprising
- 40 to 55% by weight, based on the total amount of monomers M1, of monomers M1 of formula (I), wherein R is an unbranched alkyl chain comprising 18 carbon atoms;
- 10 to 15% by weight, based on the total amount of monomers M1, of monomers M1 of formula (I), wherein R is an unbranched alkyl chain comprising 20 carbon atoms; and
- 35 to 45% by weight, based on the total amount of monomers M1, of monomers M1 of formula (I), wherein R is an unbranched alkyl chain comprising 22 carbon atoms.

3. The dispersion according to claim 1, wherein the amount of the at least one monomer M2 is from 4 to 10% by weight based on the total amount of all reactive monomers M.

4. The dispersion according to claim 1, wherein the at least one monomer M2 is selected from the group consisting of acrylate monomers of the general formula (II), $$H_2C=CH-C(O)OR^3 \qquad (II),$$

wherein $R^3$ is a branched or unbranched alkyl chain comprising from 1 to 10 carbon atoms;
methacrylate monomers of the general formula (III)

$$H_2C=C(CH_3)-C(O)OR^4 \qquad (III),$$

wherein $R^4$ is a branched or unbranched alkyl chain comprising from 1 to 10 carbon atoms; and
styrene monomers.

5. The dispersion according to claim 1, wherein the at least one monomer M2 is butyl acrylate or 2-ethyl hexylacrylate.

6. The dispersion according to claim 1, wherein the at least one miscible solvent is 1,2-propylene glycol.

7. The dispersion according to claim 1, wherein the at least one protective colloid is a polymer obtained by the reaction of
- 15 to 30% by weight of acrylic acid, methacrylic acid, or a mixture thereof; and
- 70 to 85% by weight of methyl methacrylate, n-butyl acrylate, 2-ethylhexyl acrylate, styrene, alpha-methyl styrene, or mixtures thereof, wherein the given amounts are each based on the total amount of the at least one protective colloid.

8. The dispersion according to claim 1, wherein the at least one hydrophobic organic solvent is an aromatic or aliphatic hydrocarbon or a mixture thereof.

9. The dispersion according to claim 1, wherein the at least one surfactant is a nonionic surfactant of the general formula (IV)

$$R^5-O-(CH_2CH_2O)H \qquad (IV)$$

wherein
$R^5$ is a branched or unbranched alkyl radical having 12 to 22 carbon atoms; and
n is 5 to 30.

10. The dispersion according to claim 1, wherein the polymer P has a weight-average molecular weight $M_w$ of 20 000 to 100 000 g/mol.

11. A method for the preparation of the aqueous polymer dispersion according to claim 1, comprising the steps of
a) preparation of an aqueous monomer dispersion comprising water and further comprising
a1) 10 to 55% by weight based on the total amount of the resulting aqueous polymer dispersion of reactive monomers M, wherein the reactive monomers M comprise
- 50 to 100% by weight based on the total amount of the reactive monomers M of at least one monomer M1 of the general formula (I)

$$H_2C=CH-C(O)OR \qquad (I), \text{ and}$$

- 0 to 50% by weight based on the total amount of the reactive monomers M of at least one monomer M2, which is different from monomer M1, wherein the amounts of the monomers M1 and M2 are each based on the total amount of all reactive monomers M;
a2) 0 to 30% by weight based on the total amount of the resulting aqueous polymer dispersion of at least one hydrophobic organic solvent;
a3) 10 to 30% by weight based on the total amount of reactive monomers M of at least one protective colloid;
a4) 0 to 24.5% by weight based on the total amount of the resulting aqueous polymer dispersion of at least one miscible solvent;
a5) 0 to 5% by weight based on the total amount of the resulting aqueous polymer dispersion of at least one surfactant; and
b) ultrasonic processing or homogenization of the aqueous monomer dispersion of step a);
c) addition of at least one polymerization initiator.

12. The method according to claim 11, wherein the mixture obtained in step a) is treated with ultrasound for at least 10 minutes.

13. The method according to claim 11, wherein after step b) the aqueous monomer dispersion is obtained in form of a miniemulsion.

14. A method for depressing the pour point of crude oil, petroleum, or petroleum products by adding an aqueous dispersion according to claim 1 to the crude oil, petroleum, or petroleum products.

* * * * *